United States Patent
Petersen et al.

(10) Patent No.: US 7,922,151 B2
(45) Date of Patent: Apr. 12, 2011

(54) VALVE ACTUATOR

(75) Inventors: Hans Kurt Petersen, Kolding (DK); Henning Müller, Assens (DK)

(73) Assignee: Danfoss A/S, Nordborg (DK)

( * ) Notice: Subject to any disclaimer, the term of this patent is extended or adjusted under 35 U.S.C. 154(b) by 970 days.

(21) Appl. No.: 11/577,896

(22) PCT Filed: Oct. 27, 2005

(86) PCT No.: PCT/DK2005/000692
§ 371 (c)(1), (2), (4) Date: May 15, 2007

(87) PCT Pub. No.: WO2006/045317
PCT Pub. Date: May 4, 2006

(65) Prior Publication Data
US 2008/0054207 A1     Mar. 6, 2008

(30) Foreign Application Priority Data
Oct. 28, 2004   (DK) .................... 2004 01664

(51) Int. Cl.
*F16K 31/44* (2006.01)
(52) U.S. Cl. ............................ 251/263; 251/251
(58) Field of Classification Search ............ 251/262, 251/263, 251, 252
See application file for complete search history.

(56) References Cited

U.S. PATENT DOCUMENTS

| 1,756,834 | A |   | 4/1930  | Robertson |
|-----------|---|---|---------|-----------|
| 2,580,553 | A | * | 1/1952  | King .................... 251/263 |
| 2,905,433 | A |   | 9/1959  | Till et al. |
| 3,128,635 | A |   | 4/1964  | Doolittle |
| 3,142,186 | A | * | 7/1964  | Melton et al. .............. 251/263 |
| 4,172,619 | A |   | 10/1979 | Anderson et al. |
| 4,298,183 | A |   | 11/1981 | Kawakami |
| 4,374,485 | A |   | 2/1983  | Lattuada |
| 4,460,153 | A |   | 7/1984  | Williams |
| 4,526,197 | A |   | 7/1985  | Martin et al. |
| 4,646,582 | A |   | 3/1987  | Kijima |
| 6,105,930 | A | * | 8/2000  | Nishimura et al. ........... 251/263 |

FOREIGN PATENT DOCUMENTS

| DE | 1085829 | 7/1960 |
| DE | 1815314 | 6/1970 |
| DE | 2342425 | 3/1975 |
| DE | 2424226 | 4/1975 |

(Continued)

OTHER PUBLICATIONS

PCT Search Report for Serial No. PCT/DK2005/000692 dated Jan. 12, 2006.

*Primary Examiner* — John K Fristoe, Jr.
*Assistant Examiner* — Andrew J Rost
(74) *Attorney, Agent, or Firm* — McCormick, Paulding & Huber LLP

(57) ABSTRACT

The present invention relates to a valve actuator comprising a support member for supporting a rotatable positioning element operatively connected to a valve rod. The valve actuator further comprises a track follower adapted to follow at least part of a track provided in the positioning element. The track follower is biased against at least part of the track by a resilient member. The rotatable positioning element comprises a curved outer portion arranged in an associated bearing formed in the support member.

4 Claims, 3 Drawing Sheets

FOREIGN PATENT DOCUMENTS

| | | |
|---|---|---|
| EP | 0787935 A2 | 6/1997 |
| FR | 1136781 | 5/1957 |
| FR | 2616510 | 12/1988 |
| GB | 808592 | 2/1959 |
| GB | 1197487 | 7/1970 |
| GB | 2105809 A | 3/1983 |
| GB | 2206185 A | 12/1988 |

* cited by examiner

VALVE ACTUATOR

CROSS REFERENCE TO RELATED APPLICATIONS

This application is entitled to the benefit of and incorporates by reference essential subject matter disclosed in International Patent Application No. PCT/DK2005/000692 filed on Oct. 27, 2005 and Danish Patent Application No. PA 2004 01664 filed Oct. 28, 2004.

FIELD OF THE INVENTION

The present invention relates to a valve actuator having a rotatable positioning element. In particular, the present invention relates to a valve actuator having a near circular positioning element arranged in an associated sliding bearing in a support member.

BACKGROUND OF THE INVENTION

A majority of known valve actuators, especially for larger valves, suffer from significant wear of the mechanical part. For example, significant wear often occurs between a rotatable and user operable positioning element and a support member.

An example of such prior art valve actuator may be found in GB 2 206 185 which discloses a dispense tap for dispensing carbonated liquids. The dispense tap according to GB 2 206 185 includes a flow regulator which is operated when the tap is in an intermediate position between open and closed. The intermediate position is defined by a cam surface on the tap actuator.

It is a drawback of the dispense tap according to GB 2 206 185 that in order to achieve well-defined intermediate positions a relative high friction is required between the cam surface of the tap actuator and an underlying support surface. The high friction coefficient between the cam surface and the underlying support surface naturally introduces mechanical wear of the involved part. In particular, the underlying support surface will be highly exposed to wear over time.

It is an object of the present invention to provide a valve actuator offering less wear of the mechanical part.

SUMMARY OF THE INVENTION

The present invention complies with the above-mentioned object by providing, in a first aspect, a valve actuator comprising
 a support member for supporting a rotatable positioning element, and
 a track follower being operatively connected to a valve rod, the track follower being adapted to follow at least part of a track provided by the positioning element upon rotation thereof, the track follower being biased against at least part of the track by a resilient member,
wherein the rotatable positioning element comprises a curved outer portion arranged in an associated bearing formed by the support member.

The valve actuator according to the present invention controls the position of a closing arrangement relative to a valve seating of a valve. The valve may in principle be any kind of valve such as for example a pneumatic valve or a vacuum valve. In order to activate the valve the positioning element may be operatively connected to a valve rod so as to displace the valve rod upon rotation of the positioning element, The curved outer portion of the positioning element may be shaped as an arc of a circle. Similarly, the bearing in the support member may be shaped as an arc of a circle. The bearing may be formed by a continuous surface to form a sliding bearing or, alternatively, it may be formed by discrete points which are in contact with the curved outer portion of the positioning element.

The track provided in the positioning element may be an integrated track formed into the positioning element or it may be a track arranged in a separate element which is attached to or fixed onto the positioning element.

Preferably, the positioning element comprises a substantially circular disc. The disc may be divided into two parts, a solid part and a non-solid part. The positioning element may be fabricated from a single piece of material, or it may be constituted by separate elements attached to each other so as to form the positioning element. Preferably, the positioning element is made of brass.

In order to activate the valve actuator a hand grip is attached to the positioning element. Preferably, the hand grip is attached to the solid part of the positioning element.

The non-solid part of the positioning element may comprise two detached and spatially separated disc portions. Such an arrangement will allow the valve rod to engage into a hollow region between the two detached parts. Each of the detached disc portions may comprise a track. This track may be defined as a through-going opening or it may be defined as an indentation into the detached parts. To maintain balance the tracks of the detached portions may be substantially identical and aligned with each other.

Track follower comprises a set of ball bearings or wheels rotatably mounted in relation to the valve rod. The ball bearings, which may be made of metal, may be arranged on an axel oriented essentially perpendicular to the valve rod. The axel may be secured to the valve rod using for example a bolt. Each ball bearing, which may be biased against at least part of a track, may be arranged to follow said track upon rotation of the positioning element. In this way, the ball bearings will be in contact with the track independently of the angular position of the positioning element.

In one embodiment, each track may comprise a plurality of cams and valleys. A number of valleys may be positioned between two neighbouring cams. Each valley defines a stable position for the track follower. Such stable position of the track follower defines a correspondently stable position of a closing element of the valve. Such stable position may in principle be chosen arbitrary. Examples of such positions may correspond to 0%, 10%, 20%, 30%, 50% and 100% opening of the valve. In this example the number of stable positions is six. However, also the number of stable positions may in principle be chosen arbitrary and may therefore be higher or lower than six.

In another embodiment, the track may be fabricated without any cams. Thus, the track forms a smooth surface which allows continuous and stepless opening and closing of the valve.

The support member may comprise a guiding arrangement for the track follower. This guiding arrangement may be a linear slit formed in a back-plate of the support member. The guiding arrangement is adapted to receive an extended axel part of the axel upon which the ball bearings of the track follower are mounted.

The resilient member may comprise a helical spring arranged coaxially around the valve rod. A bellow made of stainless steel may also be provided coaxially around the valve rod and the helical spring.

In a second aspect, the present invention relates to a valve comprising a valve actuator according to the first aspect of the present invention.

BRIEF DESCRIPTION OF THE DRAWINGS

The present invention will now be explained in further details with reference to the accompanying figures, wherein.

Figure 1A:
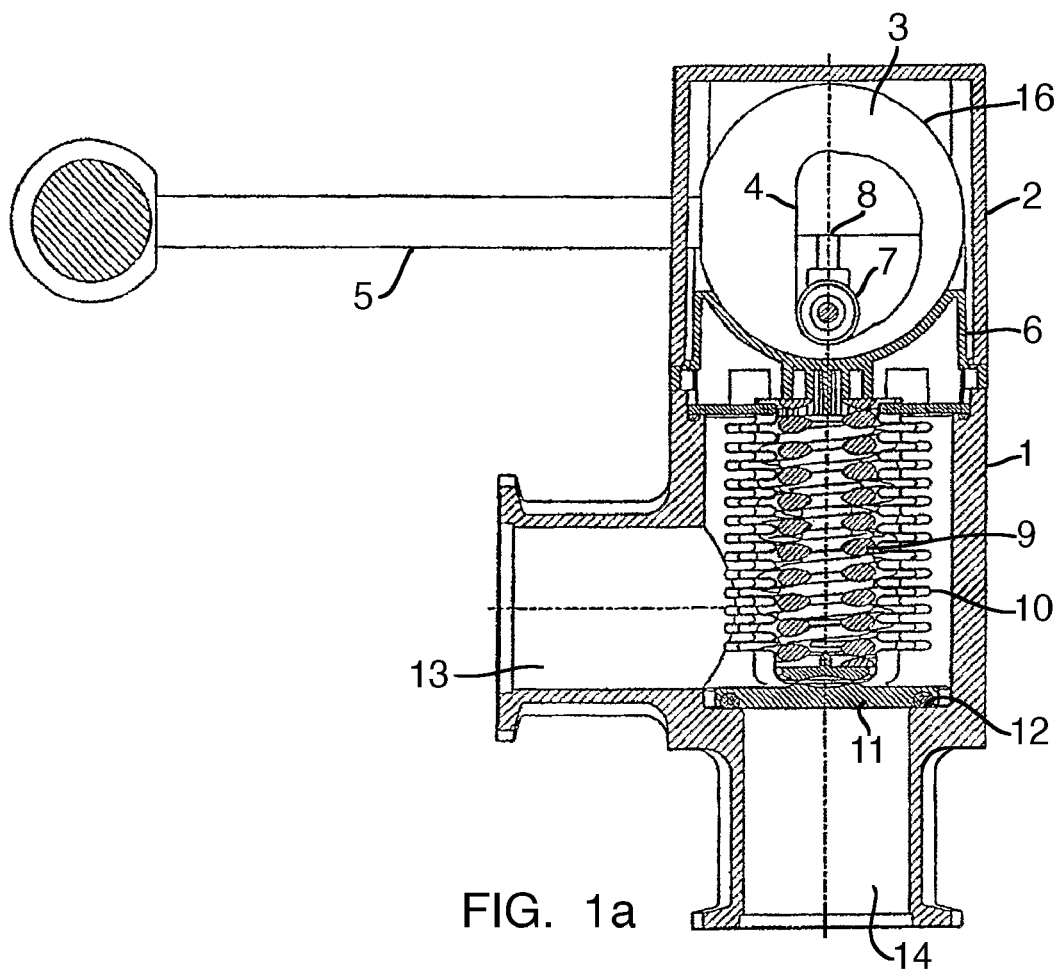
FIG. 1 shows a cross-sectional view of a first embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

Figure 1B:
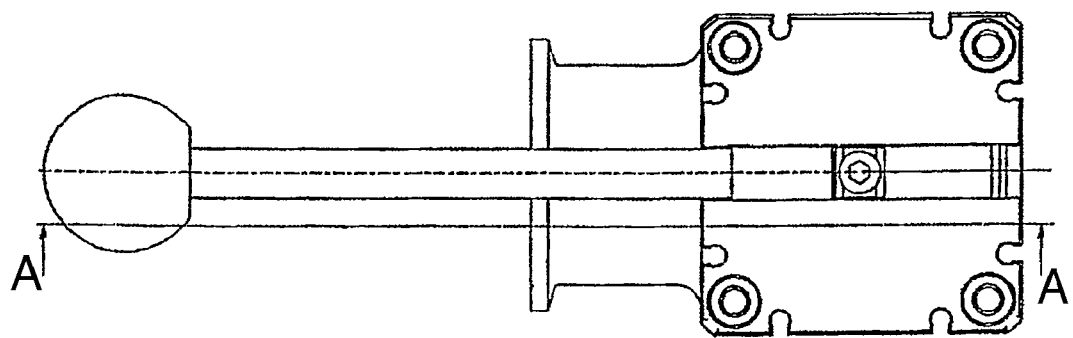

FIG. 1a shows a cross-sectional view of a valve comprising a valve actuator according to a first embodiment of the present invention. The cross-sectional view shown in FIG. 1a is taken along line AA in FIG. 1b.

According to FIG. 1a the valve has a housing 1 of aluminium or stainless steel and a cover part 2 of a synthetic material, such as plastic. However, other materials may also be applicable. The valve actuator itself comprises a positioning element 3, a track 4 arranged in an asymmetric manner relative to the positioning element 3, a hand grip 5, a support member 6 having a bearing for holding the positioning element 3, a track follower having a set of ball bearings 7, and the guiding slit 8 adapted to guide the track follower. The track follower is biased against the track 4 by a helical spring 9 which is encapsulated in a bellow 10 of stainless steel. A valve rod (not shown) connects the track follower and a closing element 11 of the valve. The closing element 11 rests on the valve seating 12 when the valve is closed. In order to ensure a hermetic sealing between the inlet 13 and outlet 14 an o-ring may be positioned in the closing element 11. Alternatively, the o-ring or a similar sealing element may be positioned in the valve seating 12.

The valve shown in FIG. 1a is operated in the following manner:

When the valve actuator is in the position shown in FIG. 1a the valve is closed. When the hand grip 5 is rotated in the clockwise direction the ball bearing 7 of the track follower will move along the track 4. Since the distance between the track 4 and the outer edge 16 of the positioning element 3 increases along the track 4 the track follower will move upwards causing the closing element 11 to separate from the valve seating 12. The largest separation is achieved when the hand grip 5, and thereby the positioning element 3, has been rotated 180 degrees in the clockwise direction. During this rotation the positioning element 3 slides in the sliding bearing 6 of the support member. To reduce friction between the positioning element 3 and the support member 6 suitable materials could be chosen. For example, if a long life time of the valve actuator is preferred the friction coefficient between the positioning element 3 and the support member 6 must be moderate. In the valve shown in FIG. 1a the positioning element 3 is made of brass whereas the support member 6 is made of a synthetic material, such as plastic. During the rotation of the positioning element 3 the track follower is guided in guiding slit 8.

The valve of FIG. 1a need not be fully opened by rotating the positioning element 3 180 degrees in the clockwise direction. The rotation may in principle be stopped at any position between the end points at the ends of the curved portion of the track 4. Further details on this intermediate positioning of the track follower will be given in connection with FIG. 2.

As seen in FIG. 1a the track 4 is constituted by a curved portion and a linear portion. The linear portion may take any shape other that linear, this portion of the track is just bridging the ends of the curved portion.

The curved portion of the track 4 may be a smoothed curved portion without any kind of cams or other bumps. In the absence of cams and bumps the distance between the curved portion of the track and the edge 16 of the positioning element 3 changes monotonically. As a consequence, the closing element 11 of the valve will perform a continuous opening movement during rotation of the positioning element 3 in the clockwise direction. Similarly, when the positioning element 3 is rotated in the counter clockwise direction the closing element 11 will undergo a continuous closing movement.

In case the curved portion of the track 4 is smooth and without any cams or other types of bumps the positioning element 3 needs to be stabilized by other means. Such other means could involve the use of a toothing mechanism arranged between the positioning element 3 and for example the support member 6, or alternatively, a high friction coefficient could be provided between the positioning element 3 and the support member 6. Such high friction coefficient could be provided by a proper choice of materials.

Figure 2:
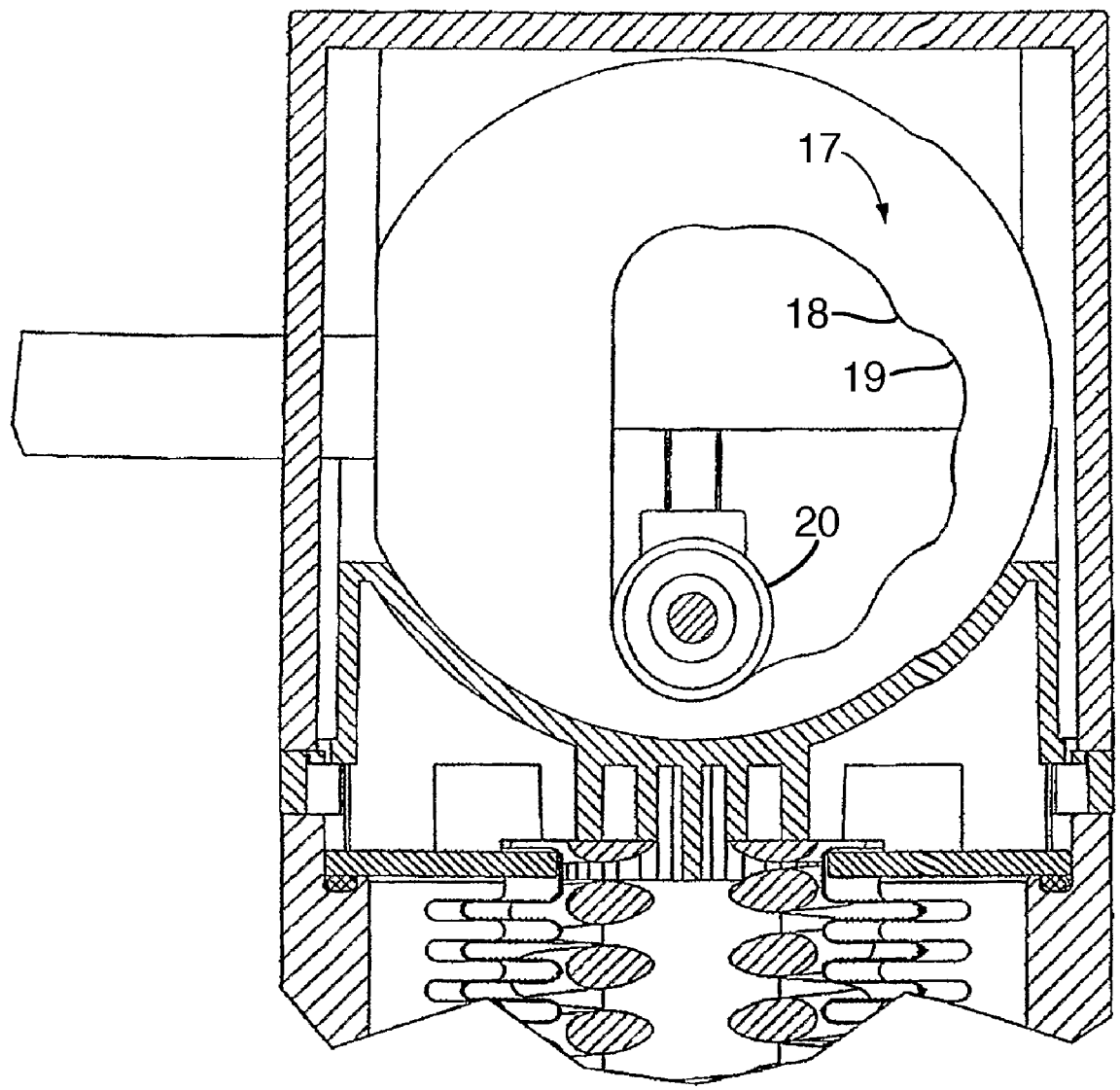
FIG. 2 shows a detailed cross-sectional view of a second embodiment of the present invention.

FIG. 2 shows a cross-sectional view of a second embodiment of the present invention where the curved portion 17 of the track comprises a plurality of cams 18 and valleys 19. The valleys 19 define stable positions for the track follower 20. Each of these stable positions defines a certain opening of the valve, for example a 10% opening. The number of cams 18 and associated valleys 19 may in principle be chosen arbitrary, only the length of the curved portion 17 and the size of the ball bearings of the track follower 20 set a limit to the number of stable positions. The positioning element shown in FIG. 2 comprises a total of 6 valleys and thereby 6 stable positions. These stable positions may for example define valve openings corresponding to a 0%, 10%, 20%, 30%, 50% and 100% opening of the valve. However, other opening levels could equally be chosen. Also the number of stable position may be chosen arbitrary. Thus, the number of stable position could be 2, 3, 4, 5, 6, 7, or 8 or even higher. A valve rod 15 operatively connecting the track follower 20 and the closing element (not shown in FIG. 2) is also shown in FIG. 2.

Figure 3:
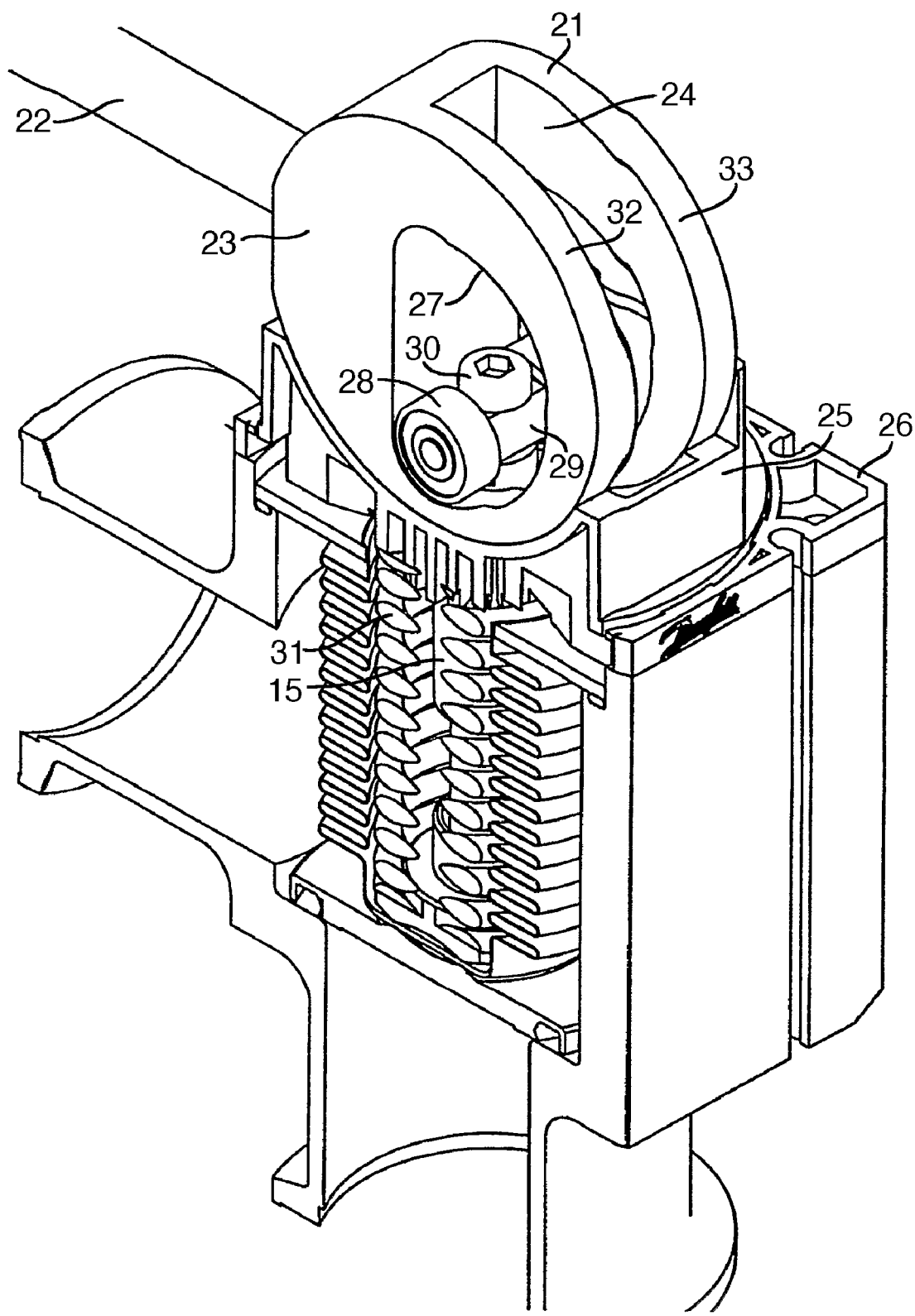
FIG. 3 shows a three-dimensional view of the present invention.

FIG. 3 shows a three-dimensional illustration of the valve actuator according to the present invention. Again, the valve actuator comprises a brass positioning element 21 with a hand grip 22. The positioning element 21 is constituted by two parts, a solid part 23 and a non-solid part 24. The positioning element may be fabricated from one piece of brass material, or alternatively, the positioning element may be constituted by several individual parts. The hand grip 22 is attached to the solid part 23. The positioning element 21 rests in a support member 25 made of a synthetic material, such as plastic. The support member 25 is attached to the aluminium housing 26 of the valve itself.

As seen in FIG. 3 the non-solid part 24 of the positioning element 21 is constituted by two detached and separated disc portions (32, 33). Each disc portion holds a track 27 which is arranged in an asymmetric manner relative to the centre of the rotatable positioning element 21. By having this asymmetric arrangement the distance between the curved portion of the track and the edge of the positioning element 21 will vary.

The track follower is constituted by two ball bearings 28 arranged on an axel 29. The axel 29 is secured to the valve rod 15 by a bolt 30. Each ball bearing 28 is biased against a track 27 by a helical spring 31.

What is claimed is:

1. A valve actuator comprising:
    a support member comprising a bearing for supporting a rotatable positioning element on the bearing, and
    a track follower being operatively connected to a valve rod, the track follower being adapted to follow at least part of a track provided by the positioning element upon rotation thereof, the track follower being biased against at least part of the track provided by the positioning element,
    wherein the track follower comprises a set of ball bearings or wheels rotatably mounted in relation to the valve rod, each ball bearing or wheel being biased against at least part of the track provided by the positioning element and arranged to follow said track upon rotation of the positioning element;
    wherein the positioning element comprises a substantially circular disc having a solid part and a non-solid part; and
    wherein the non-solid part of the positioning element comprises two detached and spatially separated disc portions.

2. The valve actuator according to claim 1, wherein each of the detached and spatially separated disc portions comprises a track, the tracks of the detached and spatially separated disc portions being substantially identical and aligned with each other, and wherein the track provided by the positioning element comprises each track of the detached and spatially separated disc portions.

3. The valve actuator according to claim 2, wherein each track of the detached and spatially separated disc portions comprises a plurality of cams and valleys, wherein a number of valleys are defined between two neighbouring cams, the valleys defining stable positions for the track follower.

4. A valve actuator comprising
    a support member comprising a bearing for supporting a rotatable positioning element on the bearing, and
    a track follower being operatively connected to a valve rod, the track follower being adapted to follow at least part of a track provided by the positioning element upon rotation thereof, the track follower being biased against at least part of the track provided by the positioning element,
    wherein the track follower comprises a set of ball bearings or wheels rotatably mounted in relation to the valve rod, each ball bearing or wheel being biased against at least part of the track provided by the positioning element and arranged to follow said track upon rotation of the positioning element;
    wherein the positioning element comprises a substantially circular disc, the circular disc having a solid part and a non-solid part, the non-solid part comprising two detached and spatially separated disc portions;
    wherein each of the detached and spatially separated disc portions comprises a track, the tracks of the detached and spatially separated disc portions being substantially identical and aligned with each other;
    wherein the track provided by the positioning element comprises each track of the detached and spatially separated disc portions; and
    wherein each track of the detached and spatially separated disc portions comprises a plurality of cams and valleys, wherein a number of valleys are defined between two neighbouring cams, the valleys defining at least three stable positions for the track follower.

* * * * *